US006807319B2

(12) United States Patent
Kovvuri et al.

(10) Patent No.: US 6,807,319 B2
(45) **Date of Patent: *Oct. 19, 2004**

(54) METHODS AND SYSTEMS FOR IMPROVING DISPLAY RESOLUTION IN ACHROMATIC IMAGES USING SUB-PIXEL SAMPLING AND VISUAL ERROR FILTERING

(75) Inventors: Rajesh Reddy K. Kovvuri, Clemson, SC (US); Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 477 days.

This patent is subject to a terminal disclaimer.

(21) Appl. No.: 09/735,425

(22) Filed: Dec. 12, 2000

(65) Prior Publication Data

US 2002/0012183 A1 Jan. 31, 2002

Related U.S. Application Data

(60) Provisional application No. 60/211,020, filed on Jun. 12, 2000.

(51) Int. Cl.[7] .................................................. G06K 9/40

(52) U.S. Cl. ........................ 382/275; 382/167; 345/204; 348/751

(58) Field of Search ................................ 382/254, 167, 382/275, 162, 261, 168, 262, 263, 264, 265, 267, 270, 214, 274, 255, 260; 345/695, 204, 647, 682, 689, 719, 756, 828; 348/751, 739; 358/520

(56) References Cited

U.S. PATENT DOCUMENTS 5,254,982 A * 10/1993 Feigenblatt et al. ........ 345/690
5,339,092 A * 8/1994 Johnson et al. ............. 345/611
5,949,428 A * 9/1999 Toelle et al. ................ 345/589
6,020,868 A * 2/2000 Greene et al. ................ 345/88
6,314,207 B1 * 11/2001 Persiantsev et al. ........ 382/236
6,339,426 B1 * 1/2002 Lui et al. ..................... 345/467
6,597,360 B1 * 7/2003 Stamm et al. .............. 345/469

OTHER PUBLICATIONS

Article Entitled" Full Color Imaging On Amplitude Color Mosaic Displays" by R. Feigenblatt, 1989 Proc. SPIE V. 1075, pp. 199–205.

Article Entitled "Color Matrix Display Image Quality," by J. Kranz and L. Silverstein, 1990 SID Symp. Digest pp. 29–32.

Article Entitled "Color Matrix Display Simulation Based upon Luminance and Chromatic Contrast Sensitivity of Early Vision" by, R. Martin, A. Ahumada and J. Larimer, SPIE. 1992, vol. 1666, pp. 336–342.

Article Entitled "A Spatial Extension Of CIELAB For Digital Color Image Reproduction" by X. Zhang and B. Wandell, SID symp.1996, Digest pp. 731–734.

Article Entitled "Displaced Filtering For Patterned Displays" by C. Betrisey, et al, 2000, SID00 Symposium Digest, pp. 296–299.

Article Entitled "Visible Differences Predictor"by S.Daly,, Ch 14 Digital Images and Human Vision, 1993, MIT Press pp. 181–206.

Article Entitled "A Visual Discrimination Model For Imaging System Design And Evaluation" Ch. 10 of Vision Models for Target Detection and Recognition, By J.Lubin, 1995, World Scientific Press.

* cited by examiner

*Primary Examiner*—Bhavesh M. Mehta
*Assistant Examiner*—Seyed Azarian
(74) *Attorney, Agent, or Firm*—Chernoff, Vilhauer, McClung & Stenzel, LLP

(57) ABSTRACT

Embodiments of the present invention provide systems and methods for converting an achromatic, higher-resolution image to a lower-resolution image with reduced visible errors. These systems and methods comprise a sub-pixel sampling performed on a higher-resolution image. The sub-pixel sampled image is then converted to an opponent color domain image that is separated into separate luminance and chrominance channels. These chrominance channels are then high-pass filtered and combined with the luminance channel to form a filtered opponent color domain image.

26 Claims, 6 Drawing Sheets

METHODS AND SYSTEMS FOR IMPROVING DISPLAY RESOLUTION IN ACHROMATIC IMAGES USING SUB-PIXEL SAMPLING AND VISUAL ERROR FILTERING

CROSS-REFERENCE TO RELATED APPLICATIONS

This application claims the benefit of U.S. Provisional Patent Application No. 60/211,020, filed Jun. 12, 2000.

The subject matter of this application is related to an application entitled "Methods and Systems for Improving Display Resolution using Sub-Pixel Sampling, and Visual Error Compensation" invented by Scott Daly and filed on the same date as this application and given U.S. patent Ser. No. 09,735,454, said application is hereby incorporated herein by reference.

The subject matter of this application is also related to an application entitled "Methods and Systems for Improving Display Resolution in Images using Sub-Pixel Sampling and Visual Error Filtering" invented by Scott Daly and Rajesh Reddy K. Kovvuri and filed on the same date as this application and given U.S. patent Ser. No. 09,735,424, said application is hereby incorporated herein by reference.

THE FIELD OF THE INVENTION

Embodiments of the present invention relate to the field of displaying high resolution images on displays with lower resolution, where the displays use a triad arrangement to display the R, G, and B or other components of the image. This triad arrangement is common in direct view LCD displays, for example, and in such an arrangement, a single pixel is composed of 3 side-by-side subpixels. Each subpixel controls only one of the three primaries (i.e., R, G and B) and is, in turn, usually controlled solely by the primaries of the digital image representation. The high-resolution image may be available in memory, or may be available directly from an algorithm (vector graphics, some font designs, and computer graphics).

BACKGROUND

The most commonly used method for displaying high-resolution images on a lower resolution display is to sample the pixels 2 of the high-resolution image 4 down to the resolution of the low-resolution display 6, as shown in FIG. 1. Then, the R, G, B values of each downsampled color pixel 8 are mapped to the separate R, G, B elements 10, 12 and 14 of each display pixel 16. These R, G, B elements 10, 12 and 14 of a display pixel are also referred to as subpixels. Because the display device does not allow overlapping color elements, the subpixels can only take on one of the three R, G, or B colors, however, the color's amplitude can be varied throughout the entire greyscale range (e.g., 0–255). The subpixels usually have a 1:3 aspect ratio (width:height), so that the resulting pixel 16 is square. The subsampling/mapping techniques do not consider the fact that the display's R, G, and B subpixels are spatially displaced; in fact they are assumed to be overlapping in the same manner as they are in the high-resolution image. This type of sampling maybe referred to as sub-sampling or traditional sub-sampling.

The pixels of the high-resolution image 4 are shown as three slightly offset stacked squares 8 to indicate their RGB values are associated for the same spatial position (i.e., pixel). One display pixel 16, consisting of one each of the R, G and B subpixels 10, 12 and 14 is shown as part of the lower-resolution triad display 6 in FIG. 1 using dark lines. Other display pixels are shown with lighter gray lines.

In this example, the high-resolution image has 3× more resolution than the display (in both horizontal and vertical dimensions). Since this direct subsampling technique causes aliasing artifacts, various methods are used, such as averaging the neighboring unsampled pixels in with the sampled pixel. Note that the common technique of averaging neighboring elements while subsampling is mathematically equal to prefiltering the high resolution image with a rectangular (rect) filter. Also, note that techniques of selecting a different pixel than the leftmost (as shown in this figure) can be considered as a prefiltering that affects only phase. Thus, most of the processing associated with preventing aliasing can be viewed as a filtering operation on the high-resolution image, even if the kernel is applied only at the sampled pixel positions.

An achromatic image, as defined in this specification and claims has no visible color variation. This achromatic condition can occur when an image contains only one layer or color channel, or when an image has multiple layers or color channels, but each color layer is identical thereby yielding a single color image.

It has been realized that the aforementioned technique does not take advantage of potential display resolution. Background information in this area may be accessed by reference to R. Fiegenblatt (1989), "Full color imaging on amplitude color mosaic displays" Proc. SPIE V. 1075, 199–205; and J. Kranz and L. Silverstein (1990) "Color matrix display image quality: The effects of luminance and spatial sampling," SID Symp. Digest 29–32 which are hereby incorporated herein by reference.

For example, in the display shown in FIG. 1, while the display pixel 16 resolution is ⅓ that of the high resolution image (source image) 4, the subpixels 10, 12 and 14 are at a resolution equal to that of the source (in the horizontal dimension). If this display were solely to be used by colorblind individuals, it would be possible to take advantage of the spatial positions of the subpixels. This approach is shown in FIG. 2 below, where the R, G, and B subpixels 10, 12 and 14 of the display are taken from the corresponding colors of different pixels 11, 13 and 15 of the high-resolution image. This allows the horizontal resolution to be at the subpixel resolution, which is 3× that of the display pixel resolution.

But what about the viewer of the display who is not color-blind? That is, the majority of viewers. Fortunately for display engineers, even observers with perfect color vision are color blind at the highest spatial frequencies. This is indicated below in FIG. 3, where idealized spatial frequency responses of the human visual system are shown.

Here, luminance 17 refers to the achromatic contact of the viewed image, and chrominance 19 refers to the color content, which is processed by the visual system as isoluminant modulations from red to green, and from blue to yellow. The color difference signals R-Y and B-Y of video are rough approximations to these modulations. For most observers, the bandwidth of the chromatic frequency response is ½ that of the luminance frequency response. Sometimes, the bandwidth of the blue-yellow modulation response is even less, down to about ⅓ of the luminance. Sampling which comprises mapping of color elements from different image pixels to the subpixels of a display pixel triad may be referred to as sub-pixel sampling.

With reference to FIG. 4, in the horizontal direction of the display, there is a range of frequencies that lie between the Nyquist of the display pixel 16(display pixel=triad pixel, giving a triad Nyquist at 0.5 cycles per triad pixel) and the Nyquist frequency of the sub-pixels elements 10, 12 and 14 (0.5 cycles per subpixel=1.5 cycles/triad pixels). This region is shown as the rectangular region 20 in FIG. 4. The resulting sinc functions from convolving the high resolution image with a rect function whose width is equal to the display sample spacing is shown as a light dashed-dot curve 22. This is the most common approach taken for modeling the display MTF (modulation transfer function) when the display is an LCD.

The sinc function resulting from convolving the high-res source image with a rect equal to the subpixel spacing is shown as a dashed curve 24, which has higher bandwidth. This is the limit imposed by the display considering that the subpixels are rect in 1D. In the shown rectangular region 20, the subpixels can display luminance information, but not chromatic information. In fact, any chromatic information in this region is aliased. Thus, in this region, by allowing chromatic aliasing, we can achieve higher frequency luminance information than allowed by the triad (i.e., display) pixels. This is the "advantage" region afforded by using sub-pixel sampling.

For applications with font display, the black & white fonts are typically preprocessed, as shown in FIG. 5. The standard pre-processing includes hinting, which refers to the centering of the font strokes on the center of the pixel, i.e., a font-stroke specific phase shift. This is usually followed by low-pass filtering, also referred to as greyscale antialiasing.

The visual frequency responses (CSFs) shown in FIG. 3 are idealized. In practice, they have a finite falloff slope, as shown in FIG. 6A. The luminance CSF 30 has been mapped from units of cy/deg to the display pixel domain (assuming a viewing distance of 1280 pixels). It is shown as the solid line 30 that has a maximum frequency near 1.5 cy/pixel (display pixel), and is bandpass in shape with a peak near 0.2 cy/pixel triad. The R:G CSF 32 is shown as the dashed line, that is lowpass with a maximum frequency near 0.5 cy/pixel. The B:Y modulation CSF 34 is shown as the dashed-dotted LPF curve with a similar maximum frequency as the R:G CSF, but with lower maximum response. The range between the cutoff frequencies of the chroma CSF 32 and 34 and the luminance CSF 30 is the region where we can allow chromatic aliasing in order to improve luminance bandwidth.

FIG. 6A also shows an idealized image power spectra 36 as a 1/f function, appearing in the figure as a straight line with a slope of −1 (since the figure is using log axes). This spectrum will repeat at the sampling frequency. These repeats are shown for the pixel 38 and the subpixel 40 sampling rates for the horizontal direction. The one occurring at lower frequencies 38 is due to the pixel sampling, and the one at the higher frequencies 40 is due to the subpixel sampling. Note that the shapes change since we are plotting on a log frequency axis. The frequencies of these repeat spectra that extend to the lower frequencies below Nyquist are referred to as aliasing. The leftmost one is chromatic aliasing 38 since it is due to the pixel sampling rate, while the luminance aliasing 40 occurs at higher frequencies because it is related to the higher sub-pixel sampling rate.

In FIG. 6A, no prefiltering has been applied to the source spectra. Consequently, aliasing, due to the pixel sampling (i.e., chromatic aliasing), extends to very low frequencies 35. Thus even though the chromatic CSF has a lower bandwidth than the luminance CSF, the color artifacts may still be visible (depending on the noise and contrast of the display).

In FIG. 6B, we have applied the prefilter (a rect function equal to three source image pixels), shown in FIG. 4 as a dashed-dotted line 22, to the source power spectrum, and it can be seen to affect the baseband spectrum 42 past 0.5 cy/pixel, causing it to have a slope steeper than −1 shown at 44. The repeats also show the effect of this prefilter. Even with this filter, we see that some chromatic aliasing (the repeated spectrum at the lower frequencies) occurs at frequencies 46 lower than the cut-off frequency of the two chrominance CSFs 32*a* and 34*a*. Thus it can be seen that simple luminance prefiltering will have a difficult time removing chromatic aliasing, without removing all the luminance frequencies past 0.5 cy/pix (i.e., the "advantage" region).

Since we are relying on the visual system differences in bandwidth as a function of luminance or chrominance to give us a luminance bandwidth boost in the "advantageous region" 20, one possibility is to design the prefiltering based on visual system models as described in C. Betrisey, et al (2000), "Displaced filtering for patterned displays," SID Symposium digest, 296–299, hereby incorporated herein by reference and illustrated in FIG. 7.

This technique ideally uses different prefilters depending on which color layer, and on which color subpixel the image is being sampled for. Thus there are 9 filters. They were designed using a human visual differences model described in X. Zhang and B. Wandell (1996) "A spatial extension of CIELAB for digital color image reproduction," SID Symp. Digest 731–734, incorporated herein by reference and shown in the FIG. 7. This was done offline, assuming the image is always black & white. In the final implementation, rect functions rather than the resulting filters are used in order to save computations. In addition, there is still some residual chromatic error that can be seen because the chromatic aliasing extends down to lower frequencies than the chromatic CSF cutoff (as seen in FIG. 6B).

However, the visual model used does not take into account the masking properties of the visual system which cause the masking of chrominance by luminance when the luminance is at medium to high contrast levels. So, in larger fonts the chromatic artifacts, which lie along the edges of the font, are masked by the high luminance contrast of the font. However, as the font size is reduced the luminance of the font reduces, and then the same chromatic artifacts become very visible (at very small fonts for example, the b/w portion of the font disappears, leaving only a localized color speckle).

SUMMARY OF THE INVENTION

Embodiments of the present invention comprise methods and systems for converting higher-resolution achromatic images to lower-resolution images typically for display on lower-resolution displays.

These embodiments perform sub-pixel sampling on a higher-resolution image to reduce the resolution to that of a display or other format. The sampled image is then converted to an opponent color domain image or some other format which provides separate luminance and chrominance data or channels. The luminance channel and the chrominance channels are then processed separately. Chrominance channels may be high-pass filtered. Luminance channels are generally kept intact to preserve luminance data.

After processing, the separate channels are combined to form a filtered opponent color domain image. This image may then be converted to an additive color domain image, such as an RGB image for display or other purposes.

In some embodiments, the original image may be low-pass filtered or otherwise processed prior to sub-pixel sampling.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The currently preferred embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

An achromatic image, as defined in this specification and claims has no visible color variation. This achromatic condition can occur when an image contains only one layer or color channel, or when an image has multiple layers or color channels, but each color layer is identical thereby yielding a single color image.

Embodiments of the present invention may be described and claimed with reference to "RGB" images or domains, or "additive color domains" or "additive color images." These terms, as used in this specification and related claims, may refer to any form of multiple component image domain with integrated luminance and chrominance information including, but not limited to, RGB domains and CMYK domains.

Embodiments of the present invention may also be described and claimed with reference to "YCbCr" images or domains, "opponent color" domains, images or channels, or "color difference" domains or images. These terms, as used in this specification and related claims, may refer to any form of multiple component image domain with channels which comprise distinct luminance channels and chrominance channels including, but not limited to, YCbCr, LAB, YUV, and YIQ domains.

Figure 1:
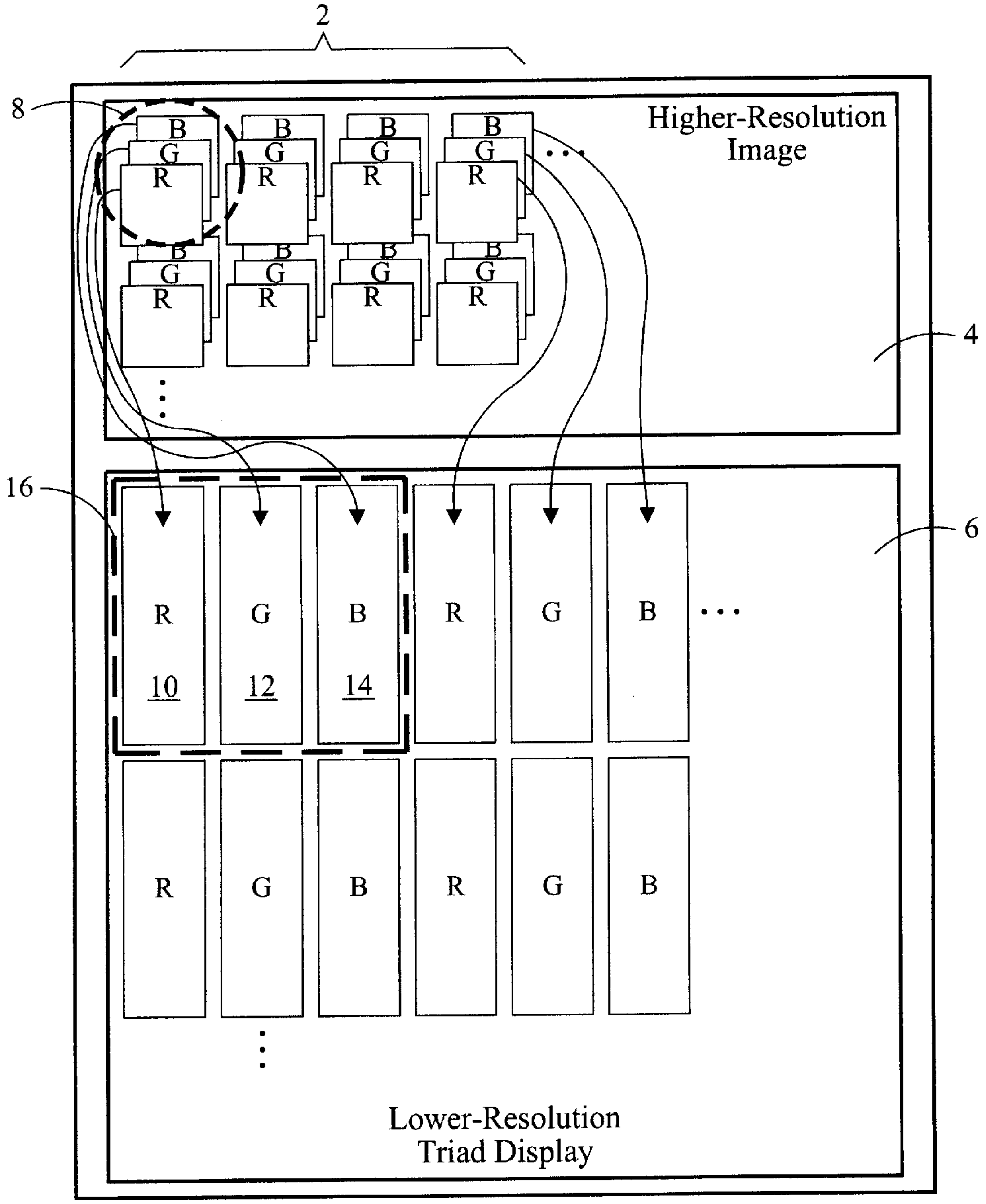
FIG. 1 is a diagram showing traditional image sub-sampling for displays with a triad pixel configuration.
Figure 2:
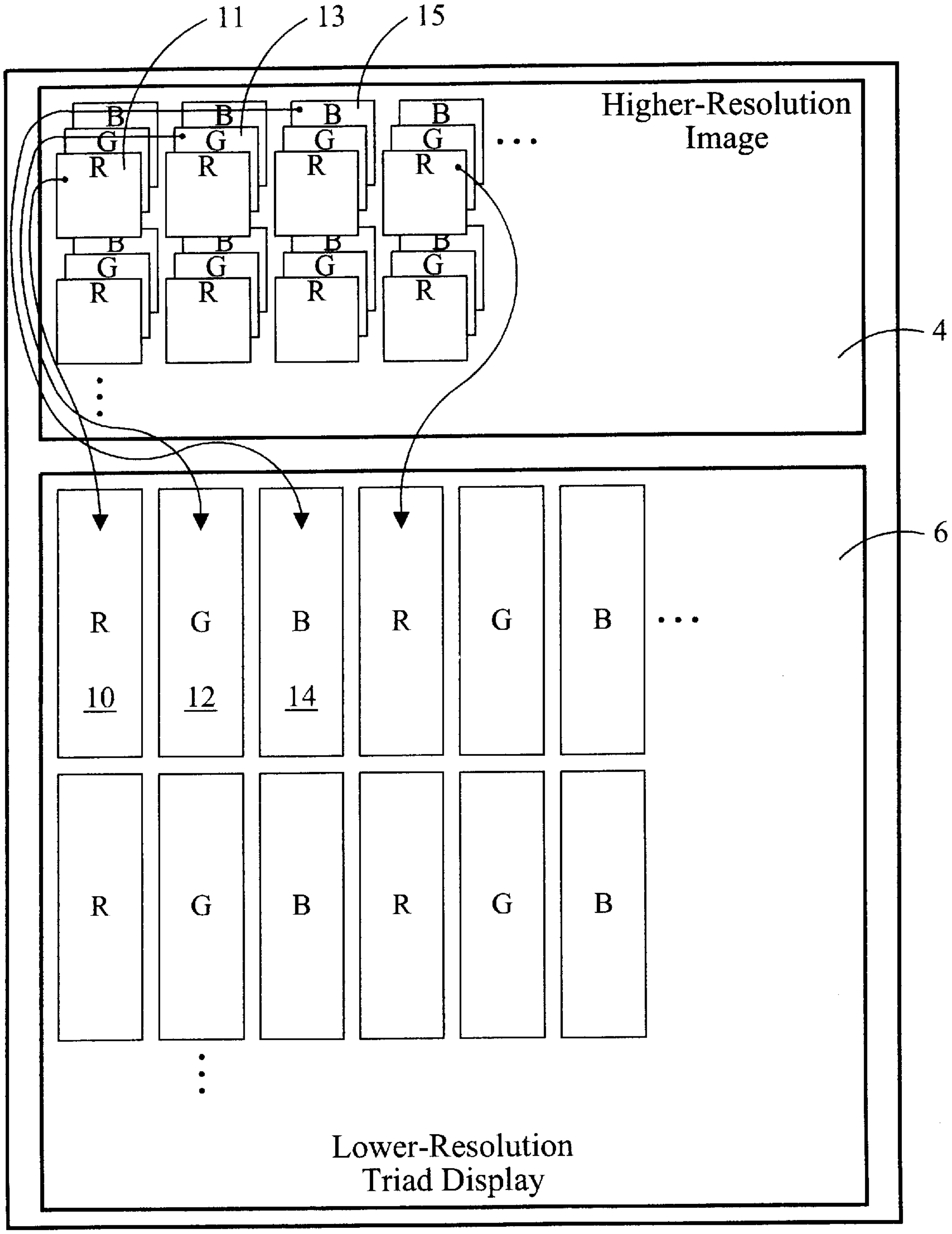
FIG. 2 is a diagram showing sub-pixel image sampling for a display with a triad pixel configuration.
Figure 3:
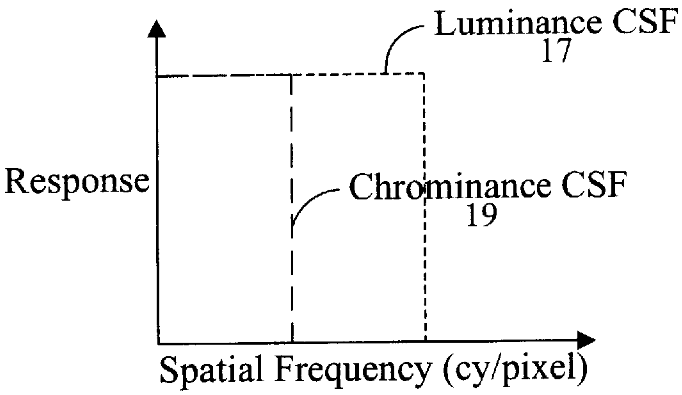
FIG. 3 is a graph showing idealized CSFs mapped to a digital frequency plane.
Figure 4:
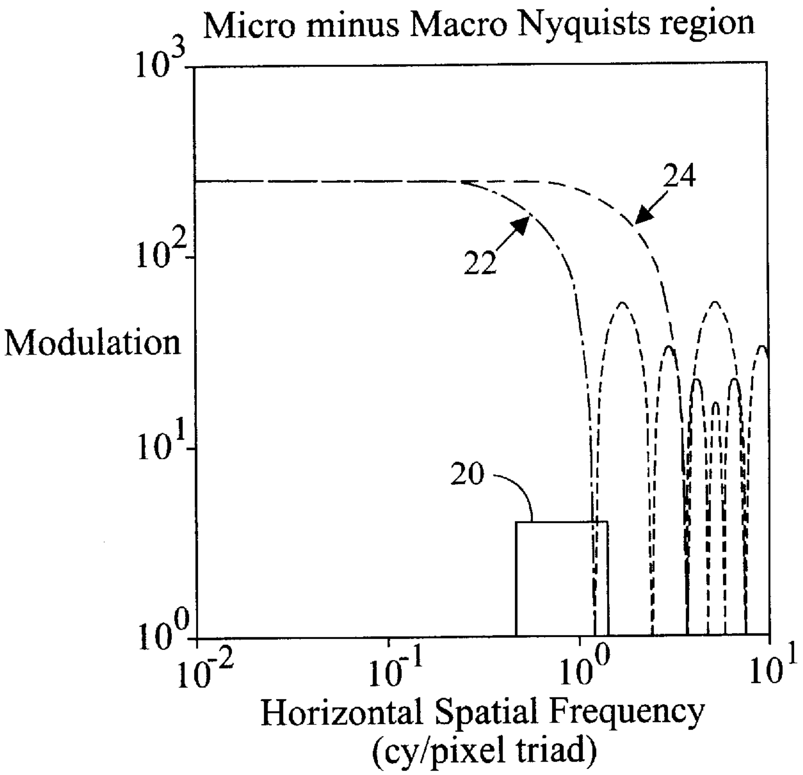
FIG. 4 is a graph showing an analysis of the pixel Nyquist and sub-pixel Nyquist regions which denotes the advantage region.
Figure 5:
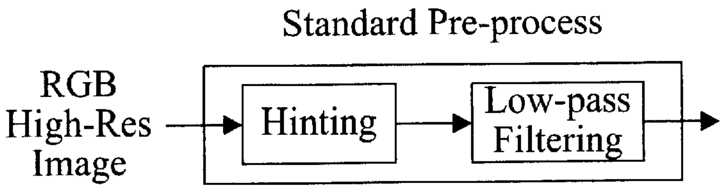
FIG. 5 shows typical pre-processing techniques.
Figure 6A:
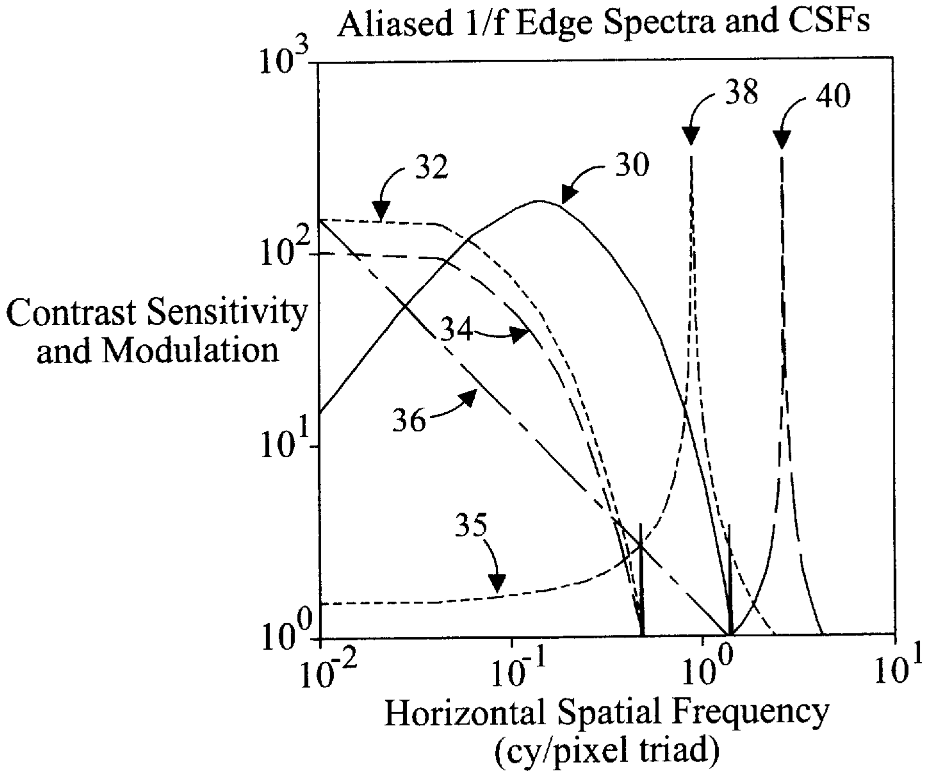
FIG. 6A is a graph showing an analysis using 1/f-power spectra repeated at pixel sampling and sub-pixel sampling frequencies.
Figure 6B:
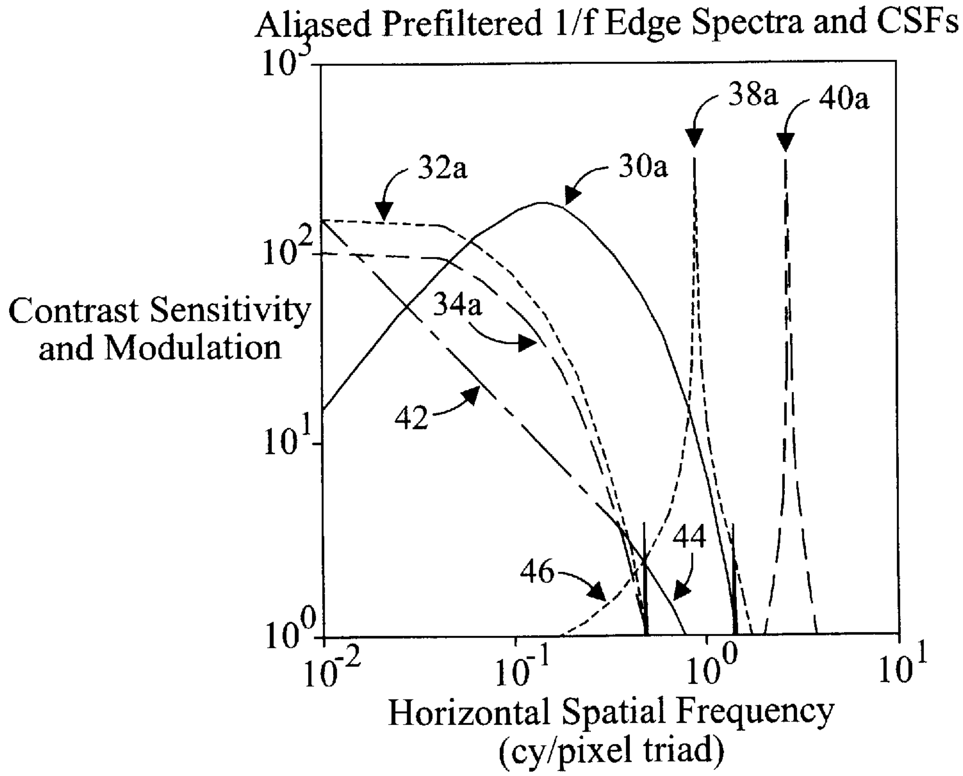
FIG. 6B is a graph showing an analysis using 1/f-power spectra repeated at pixel sampling and sub-pixel sampling frequencies with improvements due to pre-processing.
Figure 7:
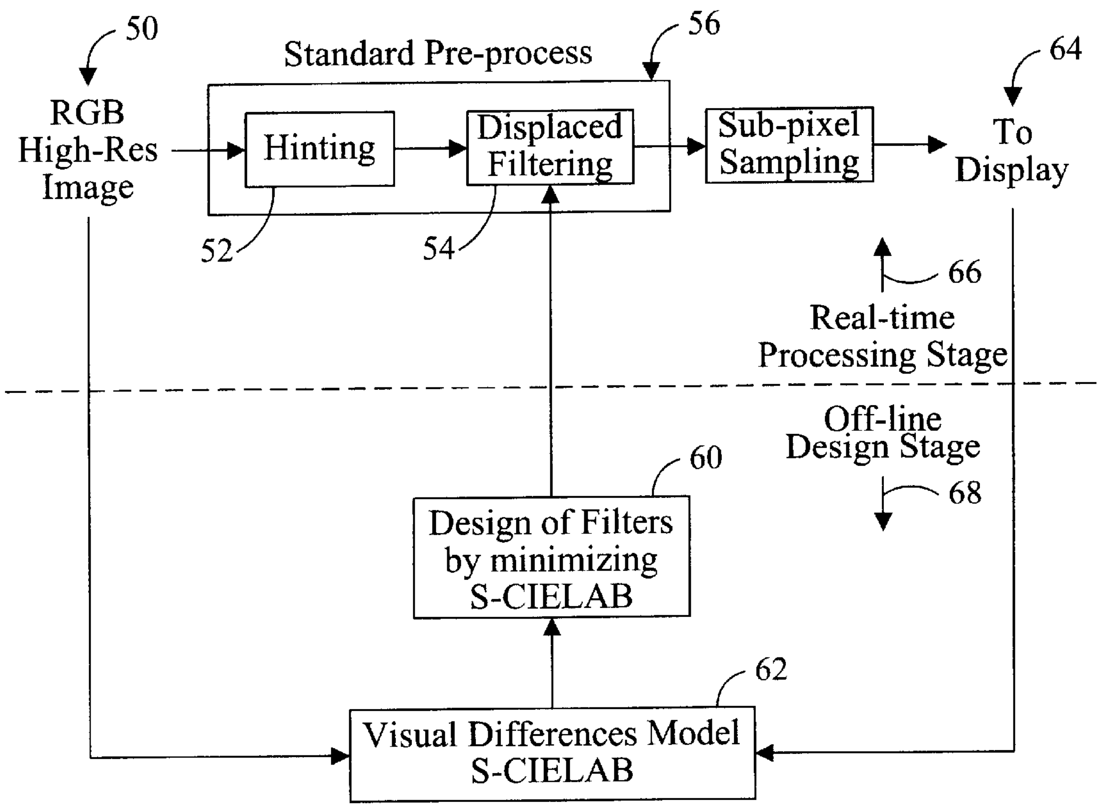
FIG. 7 is a block diagram showing a known use of a visual model.
Figure 8:
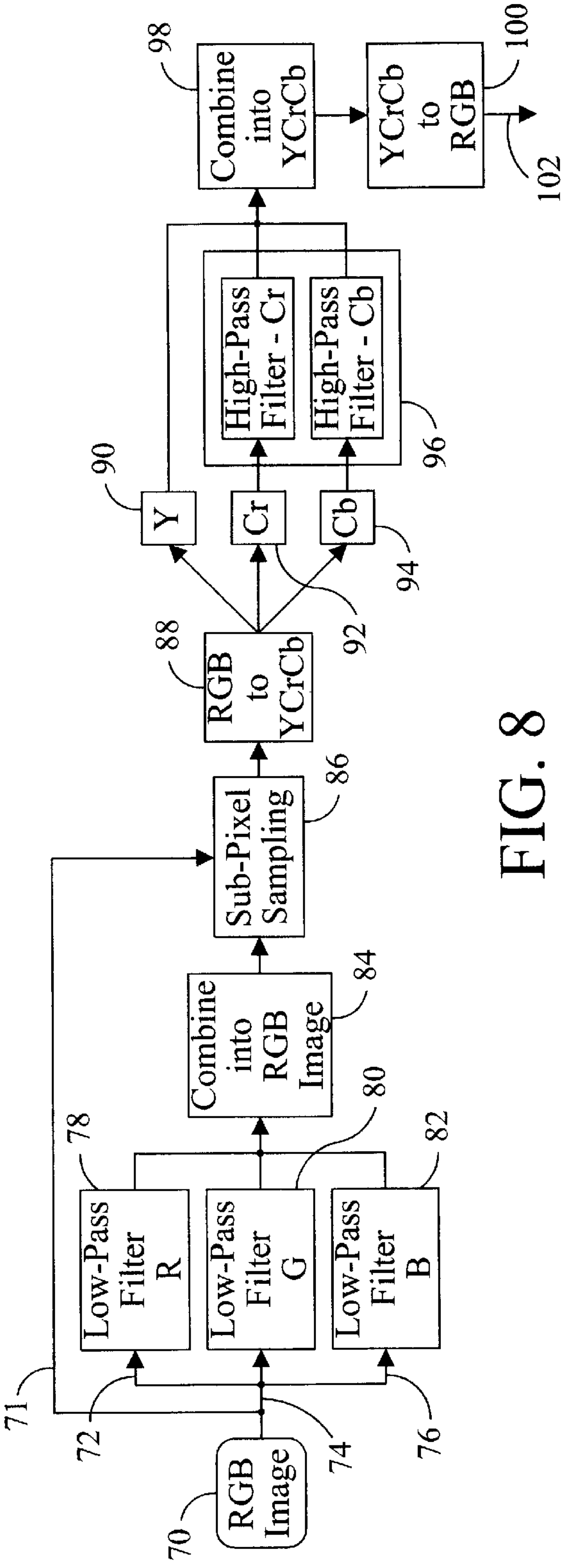
FIG. 8 is a block diagram showing a general embodiment of the present invention.

Some embodiments of the present invention are summarized in the block diagram shown in FIG. 8 wherein a high-resolution image, such as RGB high-resolution image 70, is modified. Unlike some known methods, the process is not carried out solely in the RGB domain. The YCrCb color domain may also be used, wherein the luminance and the chromatic components (Red-Green and Blue-Yellow) are separated. Other domains that are approximations to the visual systems opponent color channels will also work. Examples include CIELAB, YUV, and Y R-Y B-Y. Since we need the luminance component for the contrast, it is typically not disturbed. However, the chromatic components are subjected to modification that leads to attenuation of low chromatic frequencies, eventually yielding a better sub-pixel sampled image that has fewer visible chromatic artifacts.

Embodiments of the present invention may be used to modify images which have been pre-filtered or which exist in a format or condition which does not require initial low-pass filtering. These particular embodiments may bypass 71 the RGB separation and low-pass filtering steps and begin by processing an image 70 at sub-pixel sampling 86.

As the block diagram shows, the initial high-resolution image 70 in RGB format is separated into R 72, G 74 and B 76 data. These individual frames may then be passed through optional low pass filters (LPF) 78, 80 & 82 that, in some embodiments, may have a cut-off frequency of about 0.5 cycles/pixel (i.e., a display pixel). This filtering essentially removes any high frequency chromatic components and also makes the image band-limited. Different filters may be used for different color layers, but this is typically not necessary. Generally some luminance info is allowed to exist which is greater than the displayed pixel Nyquist; that is, the luminance frequencies within the advantage region.

The individual filtered signals are then combined to form a filtered RGB image 84 that is then subjected to sub-pixel sub-sampling 86 that achieves the 3× resolution in the horizontal direction as explained above. Unfortunately, the sub-pixel sampling introduces some chromatic artifacts, some of which may be visible as they occur at a sufficiently low spatial frequency. The goal is to remove those occurring at frequencies low enough to be visible (i.e., falling within the chromatic CSF passband). The RGB image is then split 88 into Y 90, Cb 92, and Cr 94 components. Other color domains and chromatic channels may also be used.

In this particular embodiment, the Cb 92 and Cr 94 components are then subjected to high-pass filtering 96. In some embodiments, unsharp-mask filtering using a Gaussian low-pass kernel may be used to accomplish this. When this filtering is performed, the low frequencies in Cb and Cr, that developed during sub-pixel sub-sampling, are removed by the high-pass filtering. High-pass filtering 96 generally is achieved through low-frequency attenuation rather than high-frequency enhancement. The filtered Cb and Cr components are subsequently combined 98 with the unfiltered Y component 90 and then converted 100 back to RGB to yield the final low-resolution image 102 that is ⅓ the original image's dimension with significantly reduced chromatic artifacts when compared to prior art sub-pixel sampling techniques.

Figure 9:
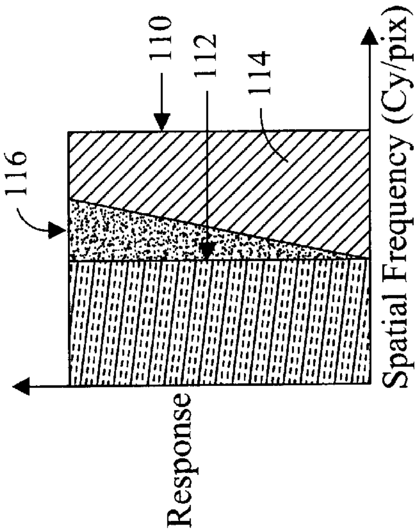
FIG. 9 is graph showing signals retained by embodiments of the present invention.

In reference to FIG. 9, the retained signals relative to the luminance CSFs 110 and chromatic CSFs 112 are shown. The chromatic signal 114 that we preserve is only the high-pass region, which is undetectable to the chromatic CSF 112. The HPF chromatic signal 114 is the chromatic aliasing that carries valid luminance info 116. Note that since no low frequency chromatic information is retained, this technique will not work with multi-chromatic images.

In some embodiments of the present invention, high-pass filtering may be performed via an unsharp mask method. The unsharp mask may use a low-pass kernel. Typically, the original image is processed with the low-pass kernel yielding a low-pass version of the image. This low-pass version is subsequently subtracted from the original unfiltered image while preserving the image's mean value. Successful embodiments have used a Gaussian low-pass kernel with a sigma of about 0.3 pixels to about 0.8 pixels. A sigma value of 0.6 pixels is thought to be particularly successful and results in a cut-off in the frequency domain of about 0.168 cycles/pixel. This gives a good unsharp-mask filter. The derivation for the Gaussian kernel is given below.

A one-dimensional Gaussian Function used in some embodiments is given as:

$$F(x) = \frac{1}{\sigma\sqrt{2\Pi}} e^{-x^2/2\sigma^2} \quad \mu = 0 \tag{1}$$

The Fourier transform of this function is given as:

$$F(k) = e^{-2\pi^2 k^2 \sigma^2} \tag{2}$$

Here we see that $\sigma$ in the space domain (units of pixels) corresponds to $1/\pi^2\sigma$ in frequency domain (units of cycles/pixel). This relation can be used to help determine the cut-off frequency of the filter given its $\sigma$, or, conversely, to determine the spatial $\sigma$ for the unsharp mask given a frequency, which may be guided by CSF models.

A 2-dimensional Gaussian function used in some embodiments is given as:

$$F(x, y) = \frac{1}{2\pi\sigma_x\sigma_y} e^{-\left(\frac{x^2}{2\sigma_x^2} + \frac{y^2}{2\sigma_y^2}\right)}, \quad \mu_x, \mu_y = 0 \tag{3}$$

Since the Gaussian function is Cartesian separable, the frequency response of the 2-dimensional Gaussian function is similar to equation (2) when the significance of $\sigma$ is considered. That is, $\sigma_x$ in time domain is $1/\pi^2\sigma_x$ in frequency domain and $\sigma_y$ in time domain is $1/\pi^2\sigma_y$ in frequency domain.

A successful embodiment of the present invention has employed a Gaussian unsharp mask filter implemented with a kernel of size 3×3, with a value for sigma chosen as 0.6 resulting in a cut-off frequency of the low-pass filter around 0.2 cycles/pix.

Other embodiments of the present invention may use high-pass filters which are equivalent to the inverse CSFs for the respective opponent color channels. These CSFs may be mapped from the domain of cy/deg (where they are modeled) to the digital domain of cy/pix. The actual mapping process takes into account the viewing distance, and allows for customization for different applications, having particular display resolutions in pixels/mm and different expected or intended viewing distances. As a result of the methods of the present invention, chromatic artifacts will be invisible when viewed no closer than the designed viewing distance. However, the luminance resolution will be improved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for converting an achromatic, higher-resolution image to a lower-resolution image with reduced visible errors, said method comprising the acts of:

performing sub-pixel sampling on said higher-resolution image;

converting said sub-pixel sampled image into an opponent color domain image;

separating said opponent color domain image into separate luminance and chrominance channels;

high-pass filtering said chrominance channels combining said luminance, and said high-pass filtered chrominance channels into a filtered opponent color domain image.

2. The method of claim 1 further comprising the act of converting said filtered opponent color domain image into a final additive color domain image.

3. The method of claim 2 wherein said additive color domain image is an RGB image.

4. The method of claim 1 wherein said opponent color domain images are YCbCr images.

5. The method of claim 1 wherein said opponent color domain images are LAB images.

6. The method of claim 1 wherein said high-pass filtering comprises unsharp-mask filtering.

7. The method of claim 1 wherein said high-pass filtering comprises the acts of: filtering said chrominance channels via an unsharp-mask filter with a Gaussian low-pass kernel resulting in low-pass chrominance channels and subtracting said low-pass chrominance channels from said chrominance channels to yield high-pass filtered chrominance channels.

8. A method for removing low-frequency chromatic artifacts created through sub-pixel sampling of an achromatic, higher-resolution image, said method comprising the acts of:

performing sub-pixel sampling on said higher-resolution image;

transforming said sub-pixel sampled image into an opponent color domain image with a segregated luminance channel and chrominance channels;

performing high-pass filtering on said chrominance channels to remove low frequencies which developed during sub-pixel sampling thereby creating filtered chrominance channels; and combining said luminance channel and said filtered chrominance channels thereby creating a filtered opponent color domain image.

9. The method of claim 8 further comprising transforming said filtered opponent color domain image into a filtered additive color domain image.

10. The method of claim 8 further comprising the acts of: copying said achromatic, higher-resolution image into component color channels; low-pass filtering said component color channels to remove high-frequency chromatic components thereby creating filtered component color channels; and combining said filtered component color channels into a filtered additive color domain image, said dividing, low-pass filtering and combining being performed prior to said performing sub-pixel samping.

11. A method for converting an achromatic, higher-resolution image to a lower-resolution image with reduced visible errors, said method comprising the acts of:

copying said achromatic, higher-resolution image into separate color channels;

low-pass filtering said separate channels;

combining said filtered channels into a filtered additive color domain image;

performing sub-pixel sampling on said filtered additive color domain image;

converting said sampled and filtered additive color domain image into an opponent color domain image;

dividing said opponent color domain image into separate luminance and chrominance channels;

high-pass filtering said chrominance channels; and combining said luminance, and said high-pass filtered chrominance channels into a filtered opponent color domain image.

12. The method of claim 11 wherein said low-pass filtering employs a cut-off frequency of about 0.2 cycles/display pixel.

13. The method of claim 8 further comprising the act of converting said filtered YCbCr image into a final RGB image.

14. The method of claim 8 further comprising the act of converting said filtered YCbCr image into a final RGB image.

15. The method of claim 8 wherein said high-pass filtering comprises the acts of:

filtering said Cb and Cr channels via an unsharp-mask filter with a Gaussian low-pass kernel resulting in low-pass Cb and Cr channels; and subtracting said low-pass Cb and Cr channels from said Cb and Cr channels to yield high-pass filtered Cb and Cr channels.

16. A method for converting an achromatic, higher-resolution image to a lower-resolution image with reduced visible errors, said method comprising steps for:

separating said achromatic, high-resolution image into separate color channels;

low-pass filtering said separate channels;

combining said filtered channels into a filtered additive color domain image;

performing sub-pixel sampling on said filtered additive color domain image;

converting said sampled and filtered additive color domain image into an opponent color domain image;

dividing said opponent color domain image into separate luminance and chrominance channels;

high-pass filtering said chrominance channels combining said luminance, and said high-pass filtered chrominance channels into a filtered opponent color domain image.

17. The method of claim 16 further comprising steps for converting said filtered opponent color domain image into a final additive color domain image.

18. A system for converting an achromatic, higher-resolution image to a lower-resolution image with reduced visible errors, said system comprising:

a first copier for copying said higher-resolution image into separate color channels;

a low-pass filter for filtering said separate channels;

a first combiner for combining said filtered channels into a filtered additive color domain image;

a sampler for performing sub-pixel sampling on said filtered additive color domain image;

a converter for converting said sampled and filtered additive color domain image into an opponent color domain image;

a second divider for dividing said opponent color domain image into separate luminance and chrominance channels;

a high-pass filter for filtering said chrominance channels a second combiner for combining said luminance, and said high-pass filtered chrominance channels into a filtered opponent color domain image.

19. A computer readable medium comprising instructions for converting an achromatic, higher-resolution image to a lower-resolution image with reduced errors, said instructions comprising the acts of:

separating said higher-resolution image into separate color channels;

low-pass filtering said separate channels;

combining said filtered channels into a filtered additive color domain image;

performing sub-pixel sampling on said filtered additive color domain image;

converting said sampled and filtered additive color domain image into an opponent color domain image;

dividing said opponent color domain image into separate luminance and chrominance channels;

high-pass filtering said chrominance channels; and combining said luminance, and said high-pass filtered chrominance channels into a filtered opponent color domain image.

20. A computer data signal embodied in an electronic transmission, said signal having the function of converting an achromatic, higher-resolution image to a lower-resolution image, said signal comprising instructions for:

copying said high-resolution image into separate color channels;

low-pass filtering said separate channels;

combining said filtered channels into a filtered additive color domain image;

performing sub-pixel sampling on said filtered additive color domain image;

converting said sampled and filtered additive color domain image into an opponent color domain image;

dividing said opponent color domain image into separate luminance and chrominance channels;

high-pass filtering said chrominance channels combining said luminance, and said high-pass filtered chrominance channels into a filtered opponent color domain image.

21. A method for re-sampling an image having chromatic information and luminance information comprising the steps of:

(a) re-sampling said luminance information using a first re-sampling process and attenuating at least a portion of lower frequency chromatic information with respect to at least a portion of higher frequency chromatic information resulting from said re-sampling of said luminance information;

(b) re-sampling said chromatic information of said image using a second re-sampling process, at least one of:

(i) re-sampling of said luminance information is different than said re-sampling of said chromatic information; and (ii) said second process processes pixels of said image in a manner different than said first process;

(c) combining said re-sampled luminance information, said re-sampled chromatic information, and at least a portion of said higher frequency chromatic information into a re-sampled image.

22. The method of claim 21 wherein said attenuating is using a high pass filter.

23. The method of claim 21 wherein said re-sampling of said luminance information results in two chromatic channels, where each of said chromatic channels is attenuated in a different manner.

24. The method of claim 21 wherein said re-sampling of said luminance information is in accordance with a model based upon the human visual system.

25. The method of claim 21 wherein said re-sampling of said luminance information of said image is performed in such a manner that chromatic aliasing is reduced from what it would have been had said re-sampling of said luminance information been re-sampled in the same manner as said re-sampling of said chromatic information.

26. The method of claim 21 wherein said re-sampling of said luminance information is performed on a luminance portion of said image free from substantial re-sampling of chromatic information of said image, while said re-sampling of said chromatic information is performed on a chromatic portion of said image free from substantial re-sampling of luminance information of said image.

* * * * *